No. 855,846. PATENTED JUNE 4, 1907.
M. GEHRE.
CONSTRUCTION OF MEASURING APPARATUS.
APPLICATION FILED SEPT. 29, 1905.
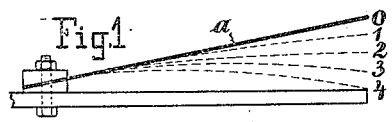
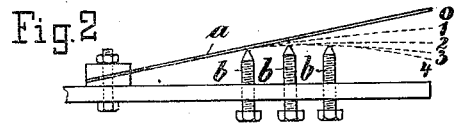
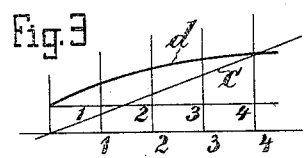
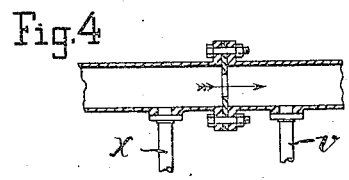
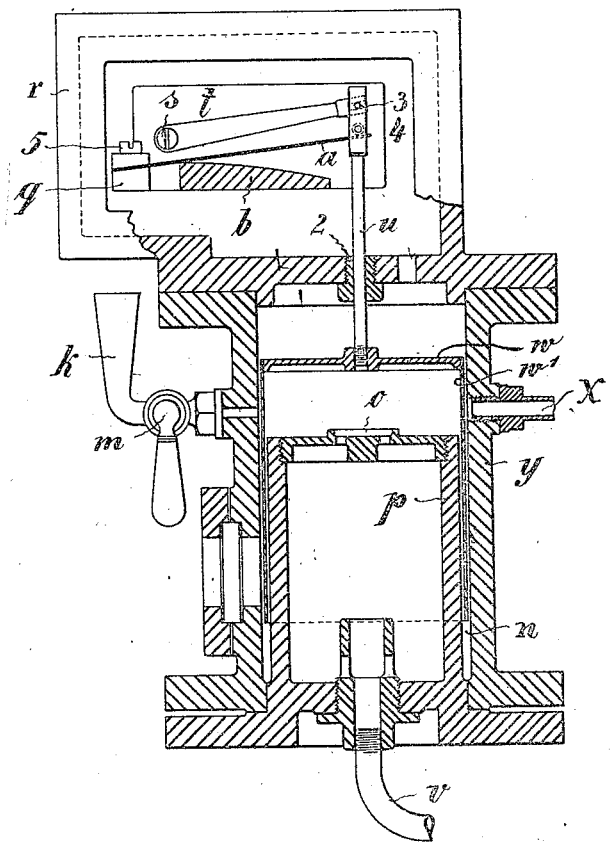
Witnesses:
Waldo M. Chapin
Wm. Dorman Jr.
Inventor
Max Gehre
by Rosenbaum & Stockbridge
attys.

UNITED STATES PATENT OFFICE.

MAX GEHRE, OF RATH, NEAR DÜSSELDORF, GERMANY.

CONSTRUCTION OF MEASURING APPARATUS.

No. 855,846.   Specification of Letters Patent.   Patented June 4, 1907.

Application filed September 29, 1905. Serial No. 280,626.

*To all whom it may concern:*

Be it known that I, MAX GEHRE, engineer, a subject of the Duke of Anhalt, residing at Rath, near Düsseldorf, in the country of the Rhine, Germany, have invented certain new and useful Improvements in the Construction of Measuring Apparatus, of which the following is a full, clear, and exact description.

The present invention relates to improvements in the construction of measuring apparatus depending on the flexion of springs and is intended to be employed in such cases, where the bending or contracting of the spring does not increase in the same proportion as the quantity or the force to be measured.

Such apparatus is used for instance for measuring the quantity of steam, passing through a steam pipe. In this case the quantity of steam is measured by the difference between the—higher—pressure existing on the one side of a contracted part of the steam pipe and the—lower—pressure on the other side. The contracted part may consist of a flange, the inner diameter of which is smaller than that of the steam pipe or of a plate with a smaller opening. If the pressure of steam on the one side of the contracted part or flange remains the same, while the pressure on the other side continuously increases, the quantity of steam passing through said opening does not increase in the same ratio as the difference between both pressures as is well known. Thus a spring being bent or stretched by the continually increasing pressure could not be used for moving or turning an indicating lever over a uniformly graduated scale because such spring would bend or stretch in direct proportion to the increasing steam pressure, while, as already mentioned, the quantity of steam passing through does not increase in direct proportion to the difference of the pressure.

The particular object of my invention is accomplished by an arrangement or device by which the effective free length of the spring is reduced step for step (in predetermined manner and according to the nature of the case) as the pressure brought to bear upon it rises. If said spring be formed of a flat steel band I attain my purpose by letting it bear against a curve shaped stop for instance in form of a plate. The spring will on bending further and further gradually increase the length of the part with which it bears against the curved edge of said plate thus reducing the length of its free end. The effective part of the spring will be therefore shortened and the ineffective part lengthened the more the spring is bent or stretched. If a helical or any other curved spring be employed, the piece with the curved edge must have a form to allow the spring to bear against it.

If the device be applied to an apparatus for measuring the quantity of steam, the effective part of the spring governing the position of the indicating lever, which itself serves to show on a scale the quantity of steam passing through the contracted part of the steam conduit, is shortened when the pressure of steam on the side of the higher pressure increases.

It will be easily understood, that the path or angle through which the indicating lever, which is connected to the spring, travels on its scale, will be shorter the more the pressure of steam increases, while showing the quantity correctly.

In the annexed drawings Figure 1 illustrates the flexion of a spring $a$, which flexion is equal for every unit of additional pressure, and this flexion is graphically illustrated by the straight line $c$ in Fig. 3. Fig. 2 shows the arrangement of the curved edge in form of a plate $b$. The flexion in this case is graphically illustrated by the curve $d$ in Fig. 3. Fig. 3 is a graphical illustration of the flexion of the spring in the cases of Figs. 1 and 2. Fig. 4 is a longitudinal section of steam pipe through which a current of steam passes and the quantity of which current is desired to be measured. The pipe is restricted or contracted at some point as shown, and pipes $x$ and $v$ are tapped on either side of such restricted portion. Fig. 5 shows an apparatus connected by a tube $x$ with the part of the steam pipe in Fig. 4 before the contraction where the higher pressure prevails and by the tube $v$ with the part after the contraction viz: the lower pressure.

The tube $x$ leads to the upper part and the tube $v$ to the lower part of the cylinder $y$. In this is movably arranged a bell-shaped piston $w$. The under bell part $w^1$ passes over a second internal cylinder $p$, which is provided with an opening $o$. Between the cylinder $y$ and the cylinder $p$ there is a deep annular space $n$, which is filled with quicksilver or any other suitable liquid.

On the side of the cylinder $y$ is fixed a cock $m$ with a funnel $k$, which may be used for filling in the quicksilver.

The piston rod $u$ passing through a guiding sleeve 2 is provided at its upper end with two pins 3 and 4 of which the former engages the lever $t$ and the latter presses down the spring $a$ which is securely clamped between the metal pieces $q$ by a screw 5. The axle $s$ of the lever $t$ passes through one of the vertical walls of the casing $r$ the bottom of which forms the lid of the cylinder $y$.

In order to avoid having the results vitiated by small quantities of steam escaping through the guiding sleeve 2, I propose to have the pressures equalized in the casing or chamber $r$ and above the piston $w$. This is readily accomplished by means of a hole 23 in the cover of the cylinder $y$.

Beneath the spring $a$ is fixed a plate $b$, the upper edge of which is curved in a suitable manner determined by the particular circumstances of the case.

At the outer end of the axle $s$ is provided the indicating lever which plays on a scale; both scale and lever being invisible in Fig. 5. An instrument as shown in Fig. 5 can be used in measuring the quantities of steam, feeding a steam engine when the latter is to be driven with different power or speed, the said intermediate flange contracted part being then provided in the main steampipe of said engine.

The apparatus acts as follows: The steam entering by the tube $x$ having the higher pressure, this will prevail on the upper side of the bell-shaped piston $w$ and tend to bend the spring $a$ downward by means of the piston rod $u$ according to the difference of pressure existing above and below the piston $w$, the two sides of the piston not communicating with each other as they are separated by the quicksilver in the annular groove $n$. The more the difference of pressure increases, the more the spring $a$ is bent down and its effective length shortened, as it gradually bears more and more against the curved edge of the plate $b$. As the pressure rises, the distance through which the spring is capable of bending becomes smaller and smaller so that it is flexed a smaller distance for a certain increment of steam pressure than before. Its flexure, however, corresponds with the quantity of steam passing through the steam pipe for the particular pressure, and the dial therefore indicates this quantity upon a uniformly graduated scale. This result is attained by making the curvature of the block $b$ in such a way that it gives the proper amount of resistance to the spring $a$ at each moment. A practical way of securing this result would be to have a number of adjustable stops in place of the block $b$ in the first instance, and when these have been experimentally regulated to the right adjustments, to plot the curve which their extremities would describe and make the block $b$ of corresponding shape.

What I claim as my invention and desire to secure by Letters-Patent is:

1. In a gage for indicating volume measurements a spring rigidly supported at one end, a support beneath such spring such support forming a continuous curve whereby the effective length of said spring becomes continuously shortened as it is bent over said support, a piston acting on the free end of said spring, a cylinder containing such piston, two tubes respectively connected to the ends of the cylinder and adapted to lead fluid into such cylinder, as set forth.

2. In a gage for indicating volume measurements a flat spring rigidly fixed at one end, a support beneath such spring such support forming a continuous curve whereby the effective length of said spring becomes continuously shortened as it is bent over said support, a piston acting on the free end of said spring, a cylinder containing such piston, two tubes respectively connected to the ends of the cylinder and adapted to lead fluid into such cylinder, as set forth.

3. In a gage for indicating volume measurements, a spring, rigidly fixed at one end, a support beneath such spring, such support forming a continuous curve whereby the effective length of said spring becomes continuously shortened as it is bent over said support, a piston having a bell-shaped lower side and acting on the free end of said spring, a cylinder containing such piston, another cylinder engaging the bell-shaped lower side of said piston and being fixedly connected to the outer cylinder, a tube containing fluid of high pressure and arranged to lead such fluid against the upper side of said piston, another tube arranged to lead fluid of lower pressure against the lower side of said piston, said outer cylinder having a fluid contained therein and adapted to fill the narrow space between the bell-shaped part of the piston and the outer and inner cylinder, as set forth.

4. In a gage for indicating volume measurements, a flat spring rigidly supported at one end, a support beneath such spring, such support forming a continuous curve whereby the effective length of said spring becomes continuously shortened as it is bent over said support, a piston having a bell-shaped lower side and acting on the free end of said spring, an outer cylinder containing such piston, an inner cylinder engaging the bell-shaped lower side of said piston and being fixedly connected to the outer cylinder, a tube containing fluid of high pressure and arranged to lead such fluid against the upper side of said piston, another tube arranged to lead fluid of lower pressure against the lower side of said piston, said outer cylinder having a fluid contained therein and adapted to fill the narrow space between the bell-shaped part of the piston and the outer and inner cylinder, as set forth.

In witness whereof, I subscribe my signature, in presence of two witnesses.

MAX GEHRE.

Witnesses:
  WILLIAM ESSENWEIN,
  MARGARETE GRATKES.